Patented Aug. 29, 1944

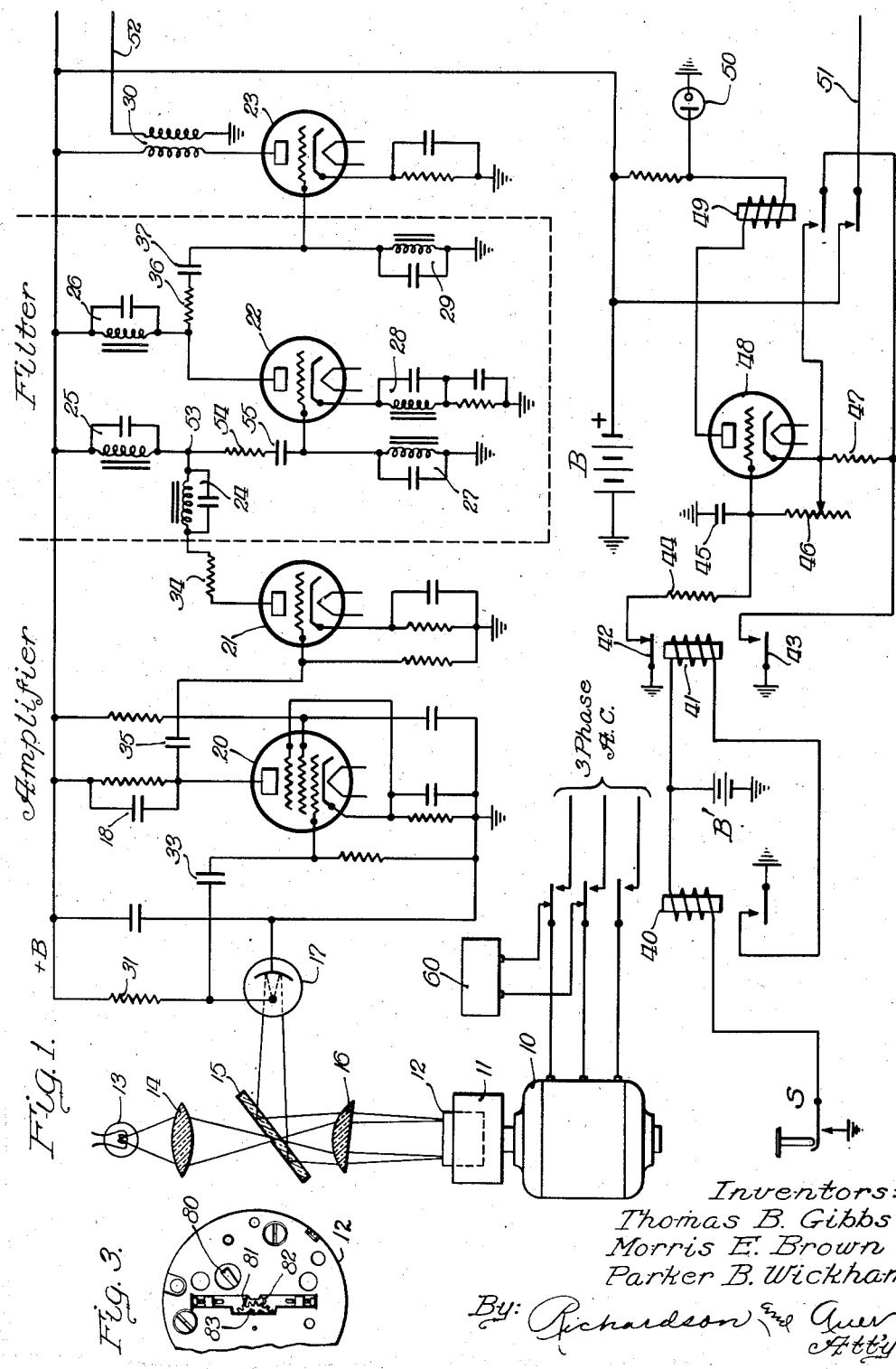

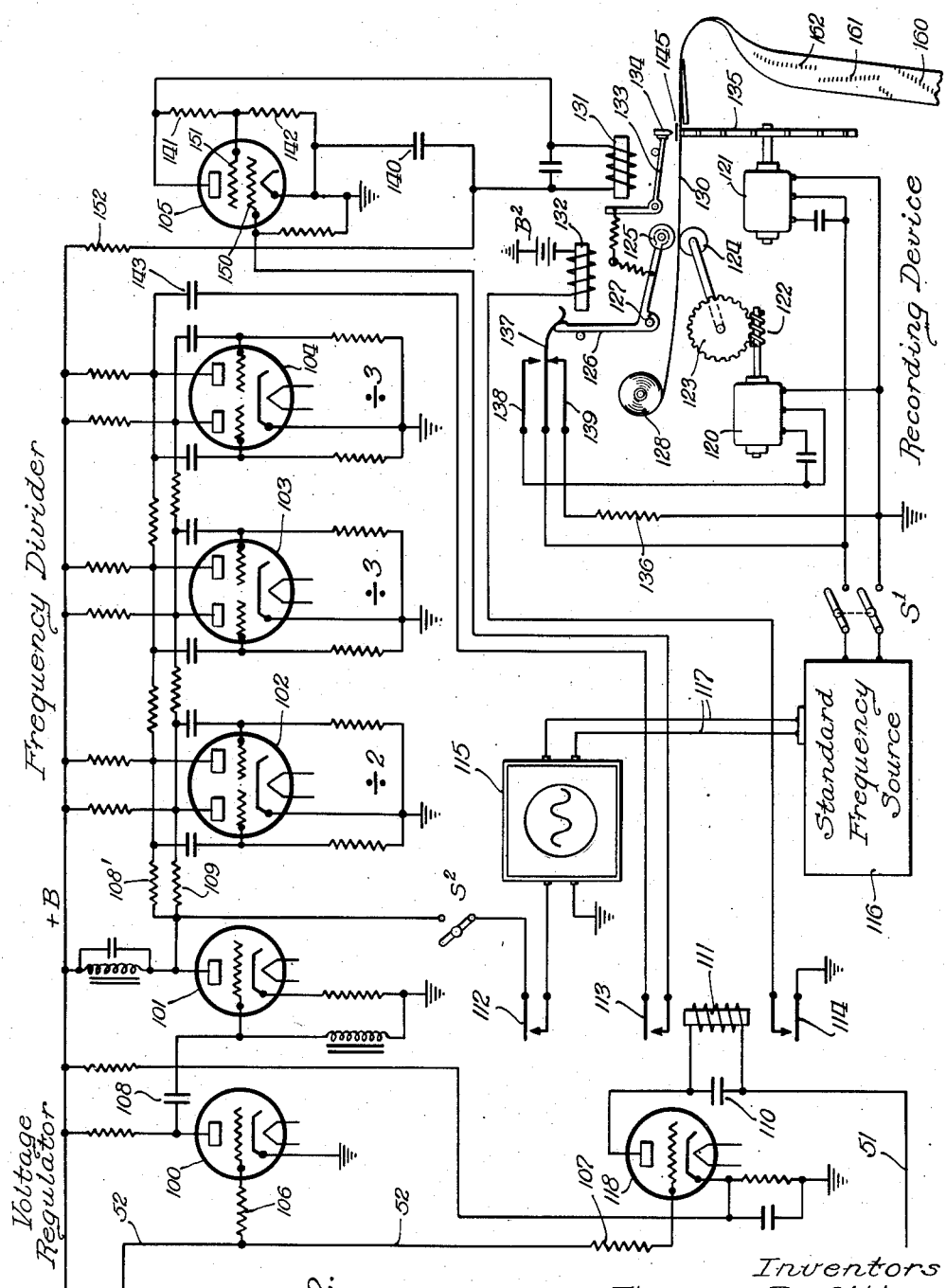

2,356,991

UNITED STATES PATENT OFFICE 2,356,991

TIMING APPARATUS

Thomas B. Gibbs, Morris E. Brown, and Parker B. Wickham, Delavan, Wis., assignors, by mesne assignments, to George W. Borg Corporation, Chicago, Ill., a corporation of Delaware Application August 3, 1940, Serial No. 350,932

17 Claims. (Cl. 73—51)

The present invention relates in general to timing apparatus, and more in particular to apparatus for timing or checking the rate of mechanical fuses such as are used in shells. A fuse of this type includes a clockwork mechanism which is driven by the power developed by centrifugal force acting on a pair of weights during rotation of the shell in its flight. The clockwork mechanism can be driven from another power source before the fuse is completely assembled, but the rotation of the shell affects the rate, and consequently it is desirable to carry out the timing operation while the fuse is undergoing rotation.

A specific object of the invention therefore is to provide an apparatus for timing a fuse of the mechanical or clockwork type while it is being rotated at a high speed, approximately 16,200 R. P. M., in order to simulate its operation when the shell in which it will eventually be used is fired.

The invention will be described hereinafter in connection with the accompanying drawings, Figs. 1, 2, and 3. Figs. 1 and 2 are diagrammatic circuit drawings showing the apparatus and circuits involved, while Fig. 3 is a partial top view of a mechanical fuse.

Referring to Figs. 1 and 2 of the drawings, the reference numeral 10 indicates a motor adapted to be driven at a speed of 16,200 R. P. M. by three-phase alternating current, as indicated in the drawings. Apparatus using direct current may also be provided for braking purposes, as indicated at 60, this apparatus including means for disconnecting the direct current after a predetermined time interval, to avoid overheating the motor. The motor rotates a chuck 11, in which the fuse 12 is securely held. This equipment is not part of the present invention and accordingly is not shown in detail.

Above the parts just described there is an optical system comprising a source of light 13, a lense 14, a mirror 15, a lens 16, and a photocell 17. The lens 14 forms the light from lamp 13 into a beam which comes to a focus near the mirror 15, whereby the beam is enabled to pass through a small unsilvered spot on the mirror and thence to the lens 16, which brings the rays nearly into parallelism and projects them onto the upper surface of the fuse 12. From the fuse the beam is reflected upward in a slightly diverging beam which passes through the lens 16, where it is converted into a converging beam which is reflected by the mirror 15 to the photocell 17. The lens 16 is positioned at a slight angle to the horizontal so that the light which is reflected upward from its lower plane surface will not reach the photocell.

Adjacent the photocell 17 is shown an amplifier comprising tubes 20 and 21. Tube 20 may be a type 6J7 pentode, while tube 21 may be a type 6C5 triode. The photocell 17 is coupled to the grid of tube 20 by means of a condenser 33. The plate circuit of tube 20 is coupled to the grid of tube 21 by means of a condenser 35.

The second amplifier tube 21 is coupled by means of resistance 34 to a filter circuit, the elements of which are enclosed within the dotted rectangle. These elements comprise a tube 22, which may be a type 6C5G tube, and a plurality of tuned circuits 24 to 29, inclusive.

The plate circuit of tube 22 is coupled to the grid of tube 23 by means of resistor 36 and condenser 37. Tube 23 is an amplifier and may be a type 6C5G tube.

Continuing with Fig. 2, the tube 100, a type 6C5G tube, is a voltage regulator. The grid of this tube is inductively coupled to the plate circuit of tube 23, Fig. 1, by means of the transformer 30.

The tube 101 may be a type 6C5G tube, and functions as an amplifier. Its grid is coupled to the plate circuit of the preceding tube 100 by means of condenser 108. The plate circuit of tube 101 is preferably tuned as shown in the drawings.

The output of tube 101 is passed to a frequency divider comprising tubes 102, 103, and 104, which may be double triodes, type 6N7. Each of these tubes functions as a multivibrator.

The output from the last multivibrator tube 104 is used to control tube 105, which may be a gas-filled tube, type 631P1.

Reverting back to Fig. 1 now, the reference character S indicates a starting switch for controlling the power relay 40, which in turn controls the motor 10.

Relay 40 also controls relay 41, which may be considered as part of a time delay device including also the tube 48 and relay 49. Tube 48 may be a type 6C5G tube. The reference character 50 indicates a constant voltage device made by the R. C. A. Manufacturing Company, Inc., and known as the type VR105-30.

Tube 118, Fig. 2, may be another type 6C5G tube and functions as an amplifier. The plate circuit of tube 118 is controlled by relay 49, Fig. 1, and its grid is controlled over conductor 52 in parallel with the grid of the tube 100. The grid has a negative bias with respect to the cathode. The plate circuit of tube 118 includes a relay 111.

The reference character 115 indicates a cathode ray oscillograph, which can be connected to the output circuit of tube 101 by means of a switch $S^2$.

At the lower right hand corner of Fig. 2 there is shown a recording device, which is of the type which employs a toothed disk rotated at constant speed and cooperating with printing means controlled by an electromagnet actuated by the impulses to be recorded to mark a moving strip of tape. This device will be briefly described.

The reference character 121 indicates a two-phase synchronous motor, which rotates the toothed disk 135. The tape is supplied from the roll 128 and is fed past the edge of disk 135 by a feed mechanism comprising the driven roller 124 and a friction roller 125. Suitable guiding means (not shown) may also be employed to give the tape a curved formation at the point where it passes the edge of the disk. The tape may fall freely as it leaves the device, as indicated in the drawings, or some known type of take-up mechanism may be used. The roller 124 is driven by a motor 120 through the medium of a speed reducing means shown as comprising the gear 123 and worm 122. The roller 125 is normally held slightly above roller 124 so that the feed mechanism is inoperative to advance the tape 130, which rests loosely on roller 124. Roller 125 is lowered to press the tape 130 against roller 124 and start the feed by means of a magnet 132, which also controls the circuit of motor 120 at contact springs 137 and 138. The tape speed may be one inch per second. The tape is marked by means of a ribbon 145, which is fed across the tape where it passes the disk 135, and a printer bar 134. The latter has a curved lower edge and is actuated by the magnet 131.

The motor 121, and also motor 120, is supplied with power from a standard frequency source indicated at 116. This apparatus may comprise a crystal oscillator and suitable amplifiers. The apparatus 116 may also be arranged to supply the sweep frequency voltage for the oscilloscope 115 as indicated in the drawings.

The various tubes are supplied with plate current from a suitable source such as a battery B, Fig. 1. It is also understood that a source of current is provided for the cathode heater circuits indicated throughout the drawings. The batteries B and B² may be a single battery, or any suitable source of direct current.

The apparatus having been described briefly, the operation of timing a fuse may now be described more in detail. For this purpose it will be assumed that the fuse 12 has been placed in chuck 11 and that the lamp 13 is energized in suitable manner. It may also be assumed that the switch S¹, Fig. 2, is closed and that the motor 121 is running. Motor 120 is standing still, as its circuit is open at contacts 137 and 138. At contact springs 137 and 139 the resistance 136 is connected and places a load on the standard frequency source substantially equivalent to that of the motor 120.

The optical system projects a beam of light on to the top of the fuse 12, whence it is reflected to the photocell 17 in the manner described. So long as the fuse is stationary, the output from the photocell will be constant; that is, a non-varying current will flow in the circuit extending from ground, through photocell 17, resistance 31, and the plus B lead to battery B.

The operator may now depress the switch S, thereby closing a circuit for the power relay 40. On energizing, relay 40 disconnects the direct current braking apparatus 60 and connects up the three-phase alternating current supply source, whereupon the motor 10 starts and comes rapidly up to full speed, since it has practically no load. As previously mentioned, the motor is designed to rotate the fuse at a speed of 16,200 R. P. M.

The top of the fuse from which the light is reflected is a circular brass plate, as partly shown in Fig. 3. The clockwork mechanism of the fuse includes an oscillating balance or pallet arm 80, two pallets 81 and 82, and an escape wheel 83. These parts are more or less exposed through cut-out portions of the top plate of the fuse. The light is reflected from the fuse as a whole; that is, the reflected beam comes partly from the parts beneath the top plate as well as from the plate itself.

As the fuse comes up to speed the clockwork mechanism begins to operate. The frequency of the balance or pallet arm may be 344 beats, or 172 complete cycles, per second. The mechanism is operated by power supplied by the rotation of the fuse, as previously stated.

The rotation of the fuse affects the beam of light which is reflected to the photocell 17 in such a manner that a varying output is produced, made up of components of different frequencies. The principle component appears to be due to the rotation of the fuse and has a frequency of 270 cycles per second, corresponding to a rotational speed of 16,200 R. P. M. Other components have frequencies of 344 and 172 cycles per second, and are caused by the moving parts of the clockwork mechanism which are exposed to the light beam. These components therefore have frequencies which depend on or vary with the rate of the clockwork mechanism, and one of them is used for timing purposes. The one used is the component having the 172 cycle frequency, which is more readily segregated than the 344 cycle frequency. As regards the signal ratio, it may be stated that the 270 cycle component is about ten to fifty times as great as the 172 cycle component.

There are other components in addition to those mentioned, including one whose frequency depends on the rotations per second of the escape wheel 83. They are not used in the present embodiment of the invention, however, and need not be further considered herein.

The varying currents which are produced in the photocell circuit by rotation and operation of the fuse produce varying voltages on the anode of the photocell, due to the drop across resistor 31, and these voltages are impressed on the grid of tube 20 through the condenser 33. The operation of tubes 20 and 21 in amplifying the output of the photocell 17 is in accordance with the known operation of these tubes in other situations and need not be described in detail. It may be mentioned, however, that the low capacity condenser 18 has a slight selective action with respect to the higher frequency components and slightly reduces the ratio of the 270 cycle component to the 172 cycle component.

The output from tube 21 is delivered through the resistor 34 to the filter circuit, which performs the main part of the work of eliminating the unwanted 270 cycle component. In the filter the tuned circuits 24 and 28 are tuned to a frequency of 270 cycles per second, while tuned circuits 25, 27, 26, and 29 are tuned to a frequency of 172 cycles per second. The tuned circuit 24 offers a high impedance to the 270 cycle component and a relatively low impedance to the 172 cycle component. The effect of the tuned circuit 25 is just the opposite. Accordingly these two tuned circuits act selectively on the two components and at their junction 53 the ratio of the 270 cycle potentials to the 172 cycle potentials is decreased considerably. The junction 53 is connected to ground through a resistor 54, blocking condenser 55, and tuned circuit 27. The resistor 54 offers the same impedance to both components, but the tuned circuit 27 offers relatively much greater impedance to the 172 cycle component, and consequently the drop across this tuned circuit is much greater for the 172 cycle component than for the 270 cycle component. Accordingly, the former impresses on the grid of tube 22 relatively much greater voltage changes in proportion to its value at this point than the latter.

The tube 22 functions as an amplifier, but amplifies the 172 cycle component more efficiently, due to the presence of the tuned circuit 28 in the cathode circuit of the tube. The tuned circuit 26 in the plate circuit functions in the same manner as tuned circuit 25, offering relatively high impedance to 172 cycle currents. The plate circuit is connected to ground through resistor 36, blocking condenser 37, and tuned circuit 29, the latter functioning the same as tuned circuit 27.

The foregoing explanation of the filter operation is non-technical and not entirely complete as to details, but will be sufficient to make clear the principles involved. It will be appreciated that a considerable problem is involved in the elimination of the 270 cycle component, which as stated previously may be on the order of fifty times as great as the 172 cycle component. The problem is successfully solved, however, by the filter arrangement shown, which is so effective that the ratio of 270 cycle voltages impressed on the grid of tube 23 to the 172 cycle voltages at the same point is no greater than about 1 to 25, even for the worst condition met with in practice. From this point on the 270 cycle component can be neglected.

The tube 23 operates as an amplifier and supplies 172 cycle signal current to the grids of tubes 100 and 118 over conductor 52. There is a considerable variation in the 172 cycle output from different fuses, and consequently it is desirable to provide further amplification at this point in order that an entirely safe value of signal current will be obtained with any fuse. Since there is no load on circuit 52, which merely supplies control voltages to the grids of tubes 100 and 118, voltage amplification is all that is required and a step up transformer 30 may be employed. The secondary to primary ratio of the transformer may be about 3 to 1.

By the foregoing means the filter output is amplified to such an extent that the minimum voltage change which is produced at conductor 52 by the 172 cycle signal current is about 5 volts. The maximum voltage change may be much greater; as much as 100 volts has been observed. This great variation is not of any great importance as regards tube 118, the operation of which will be explained presently, but it renders the signal current entirely unsuitable for controlling the frequency divider. The necessary correction is introduced by the tube 100, which operates as a voltage regulator. At this tube the effect of each negative half wave is limited by the cut-off characteristic of the tube and the effect of each positive half wave is limited by the high resistance 106, which may have a value of about 10 megohms. Due to the presence of resistance 106 in series with the grid, the latter can become only very slightly positive with respect to the cathode. The plate current therefore changes between zero and a small value, regardless of the amplitude of the signals applied to the grid, and the output has a flat topped wave shape of substantially constant amplitude.

The output from tube 100 is applied to the grid of tube 101, which functions in known manner as an amplifier. The plate circuit of tube 101 is preferably tuned as shown in the drawings in order to correct the wave shape of the output, which desirably should have approximately a sine wave form.

The output of tube 101 is used to control the first stage multivibrator 102 of the frequency divider. The frequency divider is provided for the purpose of reducing the frequency of the signal current derived from operation of the fuse to a lower frequency suitable for controlling the recording mechanism, the lower frequency bearing a definite fixed relation to the signal frequency. The operation of a multivibrator is known and hence need not be described in detail. It will suffice to say that the first multivibrator is controlled over resistances 108' and 109 and oscillates at a frequency of 86 cycles per second, thus dividing the 172 cycle signal frequency by 2. The second multivibrator 103 is controlled by the first, and oscillates at a frequency of 23⅔ cycles per second, dividing by 3. The third multivibrator is controlled by the second and divides by 3 also, the final output frequency being 9⁵/₉ cycles per second. Considered as a whole, the frequency divider divides by 18; that is, the output frequency is 1/18 that of the fuse signal current.

It will be understood that the fuse signal current, referred to herein as having a frequency of 172 cycles per second, has exactly that frequency only if the particular fuse from which the current is generated is running at exactly the proper rate. If the rate is incorrect, then the frequency of the signal current will not be exactly 172 cycles per second and the output from the frequency divider will vary accordingly. This output frequency is compared with a standard frequency by the recording mechanism to determine if the rate of the fuse is correct, or is fast or slow. This part of the timing operation will be explained presently, but first it will be necessary to revert to Fig. 1 to describe certain operations which bring about the energization of relay 111, Fig. 2.

When the power relay 40, Fig. 1, is operated, it closes a circuit for relay 41 in the time delay device. On energizing, relay 41 opens a discharge circuit for the condenser 45 at contact 42. This condenser is of fairly high capacity, 2 mf., for example. Since the circuit is normally closed, the condenser will be in discharged condition. Relay 41 also closes the cathode plate circuit of tube 48 at contact 43, and the tube begins to pass current. As soon as current begins to flow the cathode assumes a positive potential with respect to ground, due to the fall of potential across resistor 47. The grid is initially at ground potential and hence is negative with respect to the cathode, which limits the current flow to a low value, insufficient to operate relay 49. Condenser 45 now begins to charge through the adjustable resistance 46, and the grid potential gradually rises and will eventually reach the same potential as the cathode. As it approaches this value the current flow is increased sufficiently to operate relay 49, which short-circuits the cathode resistor 47. The short-circuiting of this resistor increases the current flow through the relay and insures its positive operation.

The delay introduced at the tube 48 may be about two seconds and is adjusted to the desired time interval by adjusting the value of resistance 46. The length of the delay period corresponds to the accelerating time of the motor 10. When relay 49 operates, therefore, the motor 10 is running at the proper speed and the clockwork mechanism in the fuse has begun to operate. Reliable operation of the relay 49 at the expiration of the interval for which the resistance 46 is adjusted is insured by the constant voltage device 50, which maintains the positive potential applied to the relay at a constant value.

When relay 49 operates it closes the plate circuit of tube 118, Fig. 2, over conductor 51. The grid of this tube is now receiving 172 cycle signal voltages over conductor 52 and resistor 107 and accordingly an intermittent flow of plate current is established which energizes relay 111. The relay is shunted by a condenser 110, which prevents the relay from chattering and causes it to hold up steadily.

On energizing, relay 111 closes a circuit at contact 113 for applying the output from the frequency divider to the grid 150 of tube 105. Grid 150 is normally at ground potential, while the grid 151 is maintained at a selected potential somewhere between ground potential and the positive B potential by a potentiometer consisting of resistances 141 and 142. The output of the frequency divider has a wave shape characteristic of multivibrators; that is, the negative half waves are of considerable amplitude and have a steep wave front. Each negative half wave therefore drives the grid 150 to a potential which is considerably below ground potential and the potential on grid 151 has such a value that the difference in grid potentials thus developed is sufficient to start the discharge of the tube. Each time the tube becomes conductive, the condenser 140 discharges quickly over a path which includes the cathode and plate of tube 105 and the printer bar operating magnet 131, thus furnishing a short, powerful energizing impulse to the magnet, condenser 140 having sufficient capacity for the purpose. Each time the condenser 140 discharges the voltage at the plate of tube 105 is reduced to such a low value that the space discharge through the tube cannot be maintained and it becomes non-conductive. Each time the tube is extinguished in this manner, the condenser 140 charges through the resistor 152, the value of the resistor being such that the condenser becomes nearly fully charged each time. Thus it will be seen that the frequency divider output, having a frequency of 9⅗ cycles per second, is converted by means of the tube 105 into a train of unidirectional impulses having the same frequency, which actuate the printer bar magnet 131.

Relay 111 also closes a circuit for the tape feed control magnet 132, which energizes and by means of its armature 126 presses the roller 125 against the tape 130 at the point where the tape passes the roller 124. Armature 126 also actuates the contact spring 137, which disconnects the load resistor 136 and connects the motor 120 in place thereof. The motor 120 therefore starts to run and rotates the roller 124, which begins to feed the tape 130 along past the edge of the rotating disk 135. The recording device is now in operation. Each time the printer bar 134 is depressed by the energization of magnet 131, it cooperates with a tooth of the rotating disk 135 to print a mark on the tape 130, and these marks are spaced apart in a row due to the linear feed of the tape past the edge of the disk.

The rotational speed of the motor 121 is preferably so related to the number of teeth on the disk 135 that the teeth pass the tape 130 at the rate of 172 teeth per second. There may be 12 teeth on the disk, in which case the motor will run at a speed of 860 R. P. M. The output frequency of the standard frequency source is, of course, such that the motor 121 is run at the correct speed. The tooth speed is the same as the frequency of the 172 cycle signal current derived from the fuse, and since the signal current frequency is divided by 18, a total of eighteen teeth will pass the tape for each actuation of the printer bar.

The direction of the row of marks which is printed on the tape indicates to the operator whether the clockwork mechanism on the fuse is adjusted to the correct rate or not, and if the rate is incorrect, whether it is too fast or too slow. If the rate is correct, the teeth of disk 135 which are used on successive printing operations will be in exactly the same transverse position relative to the tape when the printing operations take place, and the row of marks will be parallel to the edge of the tape. If the rate of the fuse is too slow, the disk 135 will gain a little between successive printing operations and assuming clockwise rotation of the disk as viewed from the front, the row of marks will trend to the right. Similarly, if the clockwork mechanism of the fuse is too fast, the disk 135 will gradually fall behind, and the row of marks will trend to the left. In either case the sharpness of the trend, or the angle which the row of marks makes with the edge of the tape, is a measure of the amount of error in the rate.

Since the marks are printed at the rate of 9⅗ marks per second, the tape speed being one inch per second, it will be clear that in two or three seconds the row will be long enough so that the operator can determine its direction. It may be assumed that the row trends rapidly to the right as shown at 160, indicating that the fuse is considerably too slow. The operator now restores the switch S in order to stop the motor so that the fuse can be adjusted.

When the switch S is restored, relay 40 deenergizes and disconnects the motor 10 from the alternating current supply line. At the same time one phase of the line incoming to the motor is connected to the braking equipment indicated at 60, which applies direct current to the motor for a sufficient length of time to bring it to rest. The arrangement may be such that the motor is stopped in a few seconds. Relay 40 also brings about the deenergization of relay 41, whereupon the tube 48 ceases to pass current and relay 49 is deenergized, followed by the deenergization of relay 111. The latter relay stops the operation of the recording apparatus; that is, it breaks the circuit to tube 105 which controls the printer bar magnet and also stops the paper feed by breaking the circuit of magnet 132.

As soon as the motor 10 has stopped, the operator makes the required adjustment of the fuse, in the present case the adjustment being such as to make the clockwork mechanism run at a faster rate. The operator can judge as to the amount of rate change required from inspection of the record tape and makes the adjustment accordingly.

The switch S is now closed again, and another test of the fuse is made in the same manner as previously described. Assuming that the operator has speeded up the rate of the fuse slightly too much, the next printed row of marks will trend to the left somewhat, as indicated at 161. This shows the operator that the rate is still incorrect, being now too fast, and that another adjustment is necessary. It may be assumed that the next time the fuse is tested, its rate is found to be correct, as indicated by the row of marks at 162, which is parallel to the edge of the tape.

The recording apparatus provides for an extremely accurate determination of the rate of the fuse. It is, however, subject to the disadvantage that it cannot be used to time fuses having rates which are outside certain limits as regards accuracy; that is, the fuses must be somewhere near right as to rate before they can be timed with the recording apparatus. In order to take care of this situation the oscillograph 115 may be provided, whereby information as to necessary preliminary adjustment of a fuse may be obtained when required.

In case the operator encounters a fuse which does not give a readable or easily interpreted record on the recording device, the switch S² may be closed and the test repeated. The switch S² connects the 172 cycle signal current to the vertical deflecting plates of the oscillograph. The horizontal deflecting plates may be supplied with 86 cycle sweep voltage of saw tooth wave form by suitable equipment forming part of the standard frequency unit, as indicated by conductors 117. Since the sweep frequency is one-half the signal frequency, two complete waves will appear in the oscillograph, and the direction in which the waves travel will inform the operator as to whether the signal frequency is fast or slow. At the same time the rate of travel will give an indication of the amount of adjustment required. With this information the fuse can be given a preliminary adjustment which will bring its rate within the limits of the recording apparatus.

It will be understood that in practice the various equipment items which require the attention of the operator are located in a convenient manner for use. The operator may, for instance, be seated in front of the motor 10, where the operations of inserting and adjusting the fuses and removing them can be performed with facility. The recording apparatus is arranged so that the tape is fed out toward the operator within easy view, and the oscillograph should be placed where it can be seen clearly. The switch S is preferably a foot switch, so as to leave the hands of the operator free for other purposes.

The invention having been described, what is considered new and desired to have protected by Letters Patent of the United States is defined in the appended claims.

What is claimed is:

1. Apparatus for timing a fuse which operates responsive to rotation, comprising a motor for rotating said fuse, means for starting said motor, means controlled by the rotating fuse for generating signal currents having a frequency bearing a predetermined relation to the fuse frequency, means for comparing said currents with a frequency standard, and delay means automatically controlled by said starting means for delaying the operation of said comparing means until the motor has attained the proper rotational speed.

2. Apparatus for timing a fuse of the type which includes a clockwork mechanism driven by centrifugal force, said apparatus comprising a motor for rotating said fuse, means for starting said motor, means responsive to the operation of said mechanism for generating signal currents bearing a predetermined relation to the rate of said mechanism, means for comparing said currents with a frequency standard, and means for delaying the comparing operation for a sufficient length of time after the motor is started to enable the fuse to attain the rotational speed required to develop sufficient centrifugal force to operate said mechanism.

3. Apparatus for timing a mechanism including a part having periodic motion, comprising means for starting the operation of said mechanism, means including an optical system and a photo cell for generating periodic voltages responsive to motion of said part, a device for comparing the frequency of said voltages with a standard frequency, and means for automatically starting the operation of said device a predetermined time after the operation of said mechanism has been initiated.

4. Apparatus for timing a mechanism including a part having periodic motion, comprising means for starting the operation of said mechanism, means for generating periodic voltages responsive to motion of said part, a recording device including tape marking means controlled by said voltages, tape feeding means controlled by said starting means, and means for introducing a delay between the operation of said starting means and the response of said tape feeding means.

5. Apparatus for timing a mechanism including a part having periodic motion, said apparatus comprising a light source, a mirror having a small non-reflecting portion, a photo cell, lenses located on opposite sides of said mirror for projecting light from said source to said mechanism, the first lens being arranged to bring the beam to a focus approximately in the plane of the mirror so that the beam can pass through the said non-reflecting portion, the second lens being operative also to collect the beam reflected from said mechanism and project it to said photo cell by means of said mirror, means including said photo cell for generating periodic voltages responsive to motion of said part, and means for comparing the frequency of said voltages with a standard frequency.

6. Apparatus as claimed in claim 5, wherein the second lens has a plane surface on one side and is positioned at an angle to the incident and reflected beams proceeding toward and from said mechanism in order to prevent that portion of the incident beam which is reflected from said plane surface from reaching said photo cell.

7. Apparatus for timing a mechanism including a part having periodic motion, comprising means for starting the operation of said mechanism, means for generating periodic voltages responsive to motion of said part, a device for comparing the frequency of said voltages with a standard frequency, delay means for measuring the lapse of a predetermined time interval starting with the initiation of the operation of said mechanism, and means jointly controlled by said voltages and by said delay means for starting the operation of said device at the expiration of said time interval.

8. Apparatus for timing a mechanism including a part having periodic motion, comprising means for starting the operation of said mechanism, means for generating periodic voltages responsive to motion of said part, a space discharge device having a grid circuit on which said voltages are impressed, a plate circuit for said device and means for closing it a predetermined time after the operation of said mechanism has been initiated, means independent of said device for comparing the frequency of said voltages with a standard frequency, and means in said plate circuit for starting said frequency comparing means and for maintaining the same in operation.

9. Apparatus for timing a mechanism including a part having periodic motion, comprising means including an optical system and a photo cell for generating periodic voltages responsive to motion of said part, a device for comparing the frequency of said voltages with a standard frequency, said device being normally inoperative, means responsive to said voltages for rendering said device operative, and additional means also responsive to said voltages for controlling said device to compare said frequencies.

10. Apparatus for timing periodic alternating voltages, comprising a relay, means responsive to said voltages for controlling said relay, means including a space discharge device for converting said voltages to direct current impulses, a circuit controlled by said relay for rendering said device responsive to said voltages, and means for comparing the frequency of said impulses with a standard frequency.

11. Apparatus for timing periodic voltages, comprising a frequency divider responsive to said voltages to produce low frequency voltages bearing a sub-multiple relation to said periodic voltages, a device for comparing said low frequency voltages with a standard frequency, said device being normally inoperative, and means controlled by said periodic voltages over a path excluding said frequency divider to render said device operative.

12. Apparatus for timing fuses of the clockwork type which includes a part oscillating at relatively high frequency, said apparatus comprising means for rotating the fuses one at a time, means including an optical system and a photo cell for generating periodic voltages responsive to oscillation of said part while a fuse is rotating, the said voltages varying in amplitude with different fuses, means for regulating the voltages derived from successive fuses to a substantially constant amplitude value, a timer of the recording type having a marking element operable only at a relatively low frequency, and means including a frequency divider controlled by the output of said voltage regulating means to generate impulses at a sub-multiple frequency to operate said marking element.

13. Apparatus for timing a fuse which includes clockwork mechanism driven by centrifugal force, comprising means for rotating said fuse with an area at the top thereof exposed, said area being concentric with the axis of rotation and being large enough to include an off center opening through which an oscillatory part of said mechanism may be observed, means for projecting a beam of light onto said area, said beam having a large enough cross-section where it impinges on the fuse to completely cover said area, a photo cell to which said beam is reflected, means including said photo cell for generating periodic voltages including a large first component due to rotation of the fuse and a relatively small second component due to the oscillatory motion of said part, means for amplifying both components, means for selectively attenuating said components to reduce the ratio of the first component to the second, means for selectively amplifying said components to increase the ratio of the second component to the first, means for again selectively attenuating said components to substantially eliminate the first component, means for amplifying the second component after such elimination of the first component, and means for comparing the frequency of the amplified second component with a standard frequency.

14. Apparatus for timing a fuse of the type which includes clockwork mechanism driven by centrifugal force, means for rotating said fuse at high speed, means for projecting a beam of light onto said fuse, the said mechanism including a part which oscillates responsive to rotation of the fuse and which is continuously exposed to said beam in all positions which it assumes while oscillating, a photo cell to which said beam is reflected, means including said photo cell for generating periodic voltages including a large first component due to rotation of the fuse and a relatively small second component due to the oscillatory motion of said part, means comprising a plurality of selective amplification stages and intervening selective attenuating means for substantially eliminating the first component, means for further amplifying the second component, and means for comparing the frequency of the amplified second component with a standard frequency.

15. Apparatus for timing mechanical fuses of the type which operates responsive to rotation and which includes a part having oscillatory motion, said apparatus comprising means for rotating the fuses one at a time, means including an optical system and a photo cell for generating periodic voltages responsive to oscillation of the oscillatory part of a fuse which is being rotated, the said voltages varying in amplitude with different fuses, means for regulating the voltages derived from successive fuses to a substantially constant low amplitude value, means for amplifying the regulated voltages, and means for comparing the frequency of the amplified voltages with a frequency standard.

16. Apparatus for testing a fuse which includes a mechanical element operated by centrifugal force when the fuse is rotated, said apparatus comprising a motor for rotating said fuse, means for starting said motor, testing means adapted to respond to motion of said element, and means for delaying the operation of said testing means for a sufficient length of time after the said motor is started to enable the fuse to attain the rotational speed required to develop sufficient centrifugal force to operate said element.

17. Apparatus for testing a fuse having a part operated by centrifugal force when the fuse is rotated, comprising means for rotating said fuse, means for starting the operation of said rotating means, time delay means for measuring the lapse of a predetermined time interval starting with the initiation of the rotation of said fuse, testing means adapted to be controlled by motion of said part, said testing means being normally inoperative, and means controlled by said time delay means for rendering said testing means operative at the expiration of said time interval to respond to motion of said part.

THOMAS B. GIBBS.
MORRIS E. BROWN.
PARKER B. WICKHAM.